US012740637B2

(12) United States Patent
Kassab et al.

(10) Patent No.: US 12,740,637 B2
(45) Date of Patent: Sep. 22, 2026

(54) CLINICAL DISPENSER AND APPLICATOR

(71) Applicant: Wojtek Products, LLC, Canastota, NY (US)

(72) Inventors: Dorothy Kassab, Fayetteville, NY (US); James Donnelly, Ipswich, MA (US); Douglas Snell, Overland Park, KS (US); Wayne Boucher, Manchester, NH (US); James Sellers, Eliot, ME (US)

(73) Assignee: Wojtek Products, LLC, Canastota, NY (US)

( * ) Notice: Subject to any disclaimer, the term of this patent is extended or adjusted under 35 U.S.C. 154(b) by 608 days.

(21) Appl. No.: 17/166,736

(22) Filed: Feb. 3, 2021

(65) Prior Publication Data

US 2021/0153637 A1 May 27, 2021

Related U.S. Application Data

(63) Continuation of application No. 14/940,777, filed on Nov. 13, 2015, now abandoned.

(51) Int. Cl.

| | |
|---|---|
| ***A46B 11/00*** | (2006.01) |
| ***A61C 3/00*** | (2006.01) |
| ***A61C 5/62*** | (2017.01) |
| *A61C 5/60* | (2017.01) |

(52) U.S. Cl.
CPC .......... *A46B 11/0041* (2013.01); *A61C 3/005* (2013.01); *A61C 5/62* (2017.02); *A46B 2200/1046* (2013.01); *A46B 2200/202* (2013.01); *A61C 5/60* (2017.02)

(58) Field of Classification Search
CPC ........ A46B 11/0041; A46B 2200/1046; A46B 2200/202; A61C 5/62; A61C 5/60; A61C 3/005
See application file for complete search history.

(56) References Cited

U.S. PATENT DOCUMENTS

| | | | | |
|---|---|---|---|---|
| 4,199,270 | A * | 4/1980 | Tomasini | A46B 15/00 401/277 |
| 5,001,803 | A * | 3/1991 | Discko, Jr. | A61C 5/60 15/166 |
| 2003/0199946 | A1* | 10/2003 | Gutwein | A61N 5/0616 607/88 |
| 2014/0106298 | A1* | 4/2014 | Kassab | A46B 11/001 433/226 |

* cited by examiner

*Primary Examiner* — Yogesh P Patel
(74) *Attorney, Agent, or Firm* — Bond, Schoeneck & King, PLLC; Frederick J.M. Price

(57) ABSTRACT

The present invention relates to a clinical dispenser and applicator and, more particularly, to a clinical dispenser and applicator that is structured to hold and dispense a micro amount (one to several drops) of liquids/solvents in a clinical setting.

8 Claims, 13 Drawing Sheets

Comparison

CLINICAL DISPENSER AND APPLICATOR

CROSS-REFERENCE TO RELATED APPLICATION

This application is a continuation of U.S. patent application Ser. No. 14/940,777, the entirety of which is hereby incorporated by reference.

BACKGROUND OF THE INVENTION

1. Field of the Invention

The present invention relates to a clinical dispenser and applicator and, more particularly, to a clinical dispenser and applicator that is structured to hold and dispense a micro amount (one to several drops) of liquids/solvents in a clinical setting.

2. Description of the Related Art

Conventional dispensers/applicators include Microbrush® products which are used to clinically apply liquids/solvents to areas of limited access in the field of dentistry (among other uses). FIG. 1 shows a Microbrush® dispenser/applicator 100, which includes a fiber applicator tip 10, an angled neck 20, and a shaft 30.

The most common use of a Microbrush® applicator is the application of costly liquids that require one or 2 drops clinically, such as application of bonding agents and primers to tooth structure or application of silane, or Viscostat®/hemostatic agents. Current dispensers contain syringe type reservoirs that attach to the tip of the dispenser, but are not practical in use of dispensing/applying one or two drops. Also, these types of dispensers take extra steps to fill and screw on the tip and are more costly to manufacture.

The common method of application using the Microbrush® dispenser/applicator is to dispense one to two drops in a well and then dip the dispenser/applicator repeatedly, and use clinically, until the liquid is used up or following the manufacturer's recommendation as to the necessary clinically applied liquid layers.

Description of the Related Art Section Disclaimer: To the extent that specific patents/publications/products are discussed above in this Description of the Related Art Section or elsewhere in this application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

The present invention recognizes that there are potential problems and/or disadvantages with the conventional dispensers/applicators. First, bonding materials evaporate as they sit dispensed in a well waiting to be applied to teeth. Evaporation decreases effectiveness of bonding materials. Second, repeated dipping of dispensers/applicators to transfer bonding materials to teeth is cumbersome for the clinician. Third, repeated dipping of dispensers/applicators to transfer bonding materials to teeth takes more time and provides opportunity for contamination by saliva and/or possibility of moisture in the bonding process. Fourth, not having the exact amount available for use promotes waste of bonding materials as more drops are dispensed because there is ineffectiveness/inefficiency of bonding agent application. Fifth, repeated dipping provides a possibility of droplets splatter on the patient as it drops during carry over from the well to the mouth. Sixth, dispensing liquids from a syringe-type dispenser is hard to control by the operator and results in splatter of the liquid and resulting waste of the costly liquid (ex: silane dispensing in ceramic restorations). Various embodiments of the present invention may be advantageous in that they may solve or reduce one or more of the potential problems and/or disadvantages discussed above.

Various embodiments of the present invention may exhibit one or more of the following objects, features and/or advantages:

It is therefore a principal object and advantage of the present invention to provide a clinical dispenser and applicator that is adapted and/or structured to deliver/dispense liquids/solvents in a clinical setting with little or no evaporation of such liquids/solvents (such as bonding materials) as compared with the conventional dispensers/applicators.

It is another object and advantage of the present invention to provide a clinical dispenser and applicator that is adapted and/or structured to allow for elimination of repeated dipping of the dispenser/applicator to transfer bonding materials (or other liquids/solvents) to teeth which will be less cumbersome for the clinician especially in multiple teeth treatment.

It is a further object and advantage of the present invention to provide a clinical dispenser and applicator that is adapted and/or structured to allow for elimination of repeated dipping of the dispenser/applicator to transfer bonding materials (or other liquids/solvents) to teeth which will take less time and provide less opportunity for contamination by saliva and/or possibility of moisture in the bonding process.

It is another object and advantage of the present invention to provide a clinical dispenser and applicator that is adapted and/or structured to provide a more precise to an exact required amount of bonding agent (or other liquids/solvents) available for use and a decrease in bonding materials waste.

In accordance with the foregoing objects and advantages, an embodiment of the present invention is directed a clinical dispenser and applicator that can include a distal shaft extending along a longitudinal axis, at least a portion of which is hollowed out (i.e., a reservoir portion), a neck portion which is bent at an angle from the shaft (preferable about 45 degrees), a hollowed out proximal tube portion and a fiber applicator tip. The hollowed out proximal tube portion includes an exit hole, and the distal shaft is closed off at the most distal end. Stated differently, a clinical dispenser and applicator is provided comprising one or more of the following: an elongated distal shaft extending along a longitudinal axis, a portion of which is hollowed-out defining a material reservoir beginning at a proximal end thereof; a proximal applicator portion comprising: a tubular neck portion attached to the proximal end of the distal shaft and comprising a bend at an angle from the longitudinal axis, and a proximal tube portion comprising an exit hole; and wherein the hollowed-out portion of the distal shaft is configured to be squeezable to create a vacuum to suction a material into the material reservoir through the exit hole from a well containing the material and to dispense the material from the material reservoir through the exit hole onto a predetermined area of interest.

In use, the distal shaft portion can be squeezed to suction up a dispensed drop or 2 drops of bonding agent, for example. The negative pressure and capillary action will draw up the drop or 2 drops up into the reservoir portion of the distal shaft portion. In a preferable embodiment, there will be one or 2 drops available for application as a clinician squeezes again the distal shaft portion and the bonding agent will come out of the exit hole. Thus, most preferably, once a liquid is sucked up into the reservoir portion of the distal shaft portion it will not drop or spill out by itself until the clinician squeezes the handle; which therefore provides controlled and safe dispensing without wasting.

In accordance with another embodiment of the present invention, a method is provided comprising one or more of the following: a method of applying a dental composition to a tooth structure, comprising the steps of: providing a clinical dispenser and applicator comprising: an elongated distal shaft extending along a longitudinal axis, a portion of which is hollowed-out defining a material reservoir beginning at a proximal end thereof, wherein the material reservoir contains a dental composition; a proximal applicator portion comprising: a tubular neck portion attached to the proximal end of the distal shaft and comprising a bend at an angle from the longitudinal axis, and a proximal tube portion comprising an exit hole; and wherein the hollowed-out portion of the distal shaft is configured to be squeezable to dispense the dental composition from the material reservoir through the exit hole onto a tooth structure; placing the exit hole next to the tooth structure; and squeezing the hollowed-out portion of the distal shaft in order to dispense at least a portion of the dental composition onto the tooth structure.

In accordance with a further embodiment, a method is provided comprising one or more of the following: a method of applying a dental composition to a tooth structure, comprising the steps of: providing a clinical dispenser and applicator comprising: an elongated distal shaft extending along a longitudinal axis, a portion of which is hollowed-out defining a material reservoir beginning at a proximal end thereof; a proximal applicator portion comprising: a tubular neck portion attached to the proximal end of the distal shaft and comprising a bend at an angle from the longitudinal axis, and a proximal tube portion comprising an exit hole; and wherein the hollowed-out portion of the distal shaft is configured to be squeezable to dispense the dental composition from the material reservoir through the exit hole onto a tooth structure; wherein the hollowed-out portion of the distal shaft is configured to be squeezable to create a vacuum to suction a dental composition into the material reservoir through the exit hole from a well containing the dental composition and to dispense the dental composition from the material reservoir through the exit hole onto a tooth structure; placing the exit hole into a well containing the dental composition; squeezing the hollowed-out portion of the distal shaft; releasing the hollowed-out portion of the distal shaft in order to suction an amount of the dental composition into the material reservoir; placing the exit hole next to the tooth structure; and squeezing the hollowed-out portion of the distal shaft in order to dispense at least a portion of the dental composition onto the tooth structure. The dental composition (which can include bonding agent(s), medicine, and/or any other dental related compositions, or any combination thereof) can be dispensed into a mixing bowl or well and mixed in the mixing well by the clinical dispenser and applicator of an embodiment prior to applying the mixed dental composition per use of the clinical dispenser and applicator of an embodiment to a patient's teeth.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
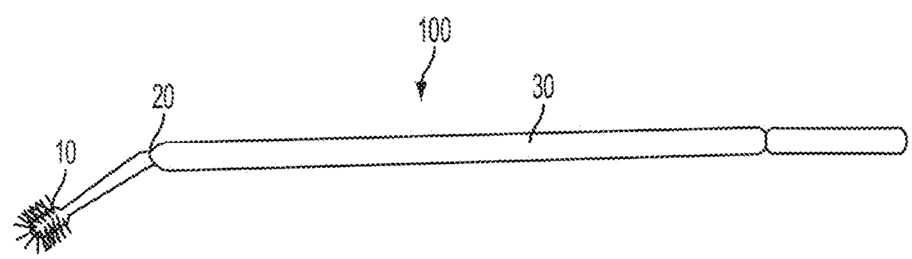
FIG. 1 is a side perspective view of a conventional Microbrush® dispenser/applicator.

The present invention will be more fully understood and appreciated by reading the following Detailed Description in conjunction with the accompanying drawings, wherein like reference numerals refer to like components. Certain dimensions are listed in some of the drawings, however, these dimensions are exemplary and embodiments of the present invention are not limited to these dimensions.

Figure 2:
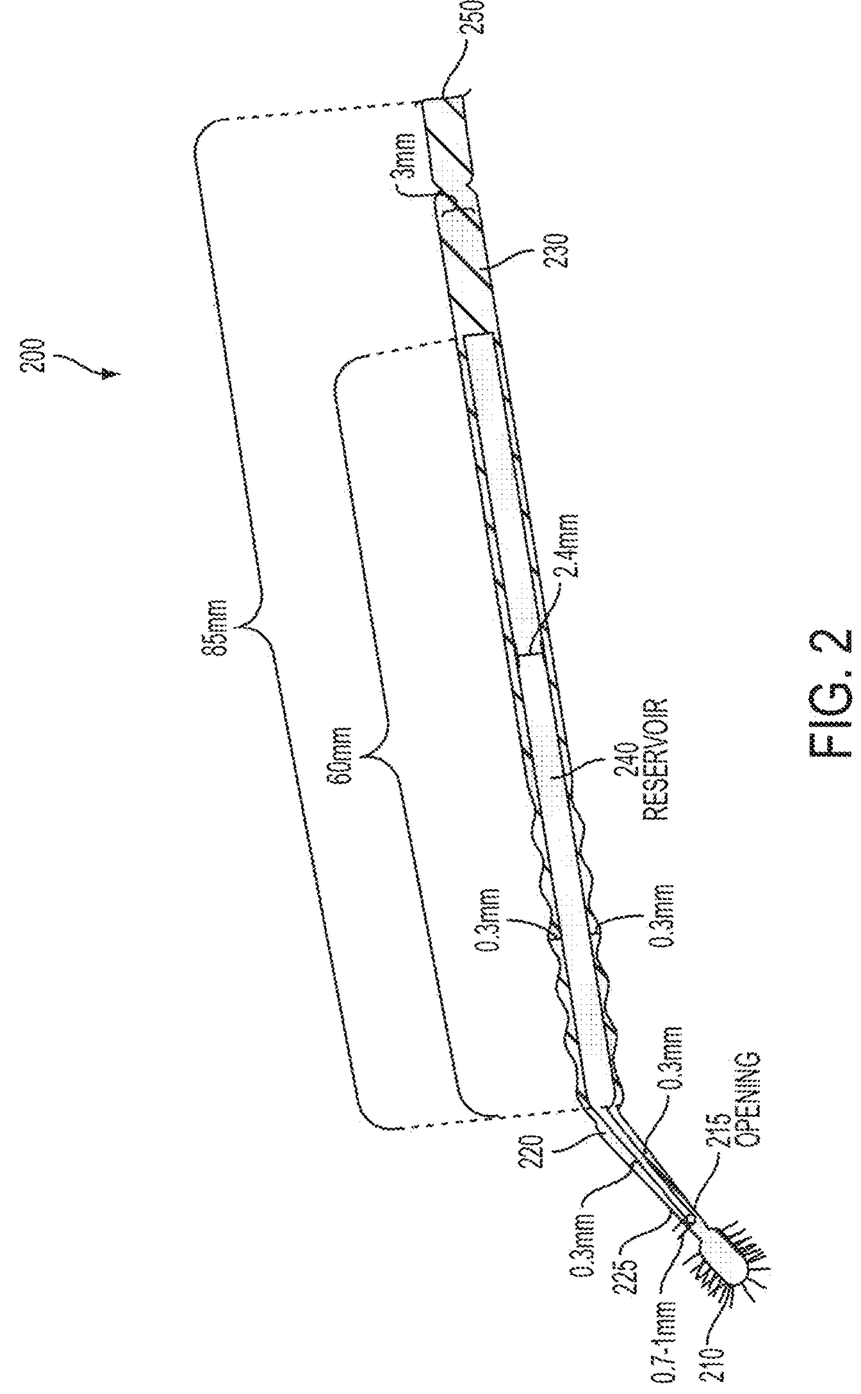
FIG. 2 is a side perspective view of a clinical dispenser and applicator, according to an embodiment of the present invention.

As shown in FIG. 2, a side perspective view of a clinical dispenser and applicator is illustrated, according to an embodiment of the present invention. The clinical dispenser and applicator 200 can include a distal shaft 230 extending along a longitudinal axis, at least a portion of which is hollowed out (i.e., a reservoir portion) 240, a neck portion 220 which is bent at an angle from the shaft (preferable about 45 degrees), a hollowed out proximal tube portion 225 and a fiber applicator tip 210. The hollowed out proximal tube portion includes an exit hole 215, and the distal shaft is closed off at the most distal end 250.

The proximal tube portion 225 can be 0.2-0.3 mm thick, about the thickness of a coffee stirrer with a narrowed area near the opening 215 (which can be bendable; could be accordion crimped similar to a bend in a drinking straw) and thinner in diameter near the tip to maintain the small size convenient for narrow treatment areas. Other measurements shown in FIG. 2 relate to a preferred embodiment of the present invention.

Figure 3B:
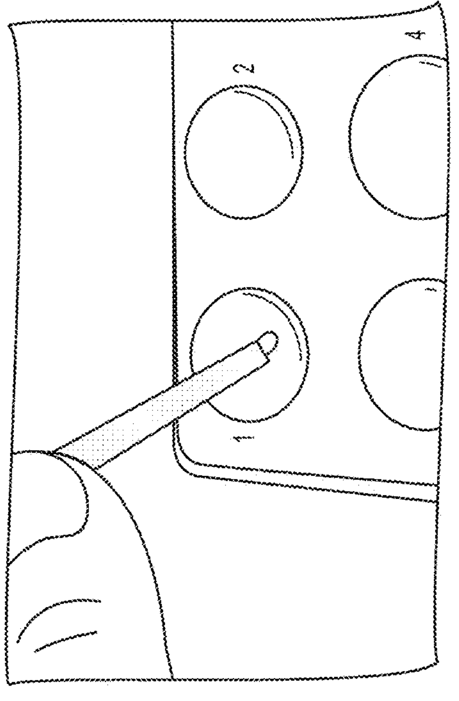
FIG. 3A and FIG. 3B are photographs illustrating the use of the clinical dispenser and applicator collecting and dispensing one to two drops of bonding agent by squeezing the proximal shaft portion, according to an embodiment of the present invention.
Figure 3A:
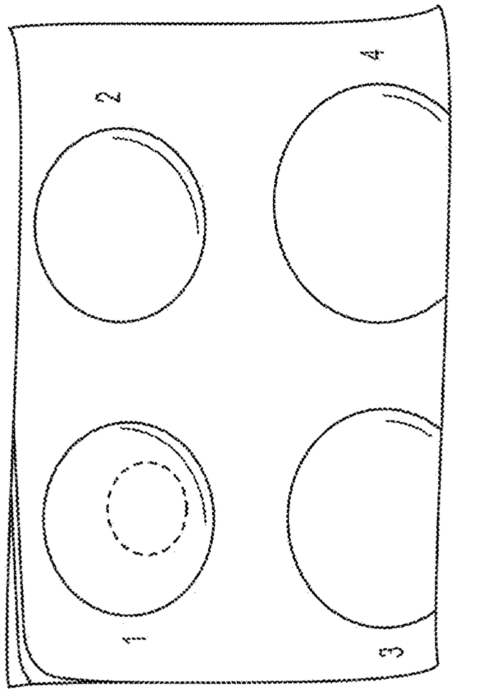

FIG. 3*a-b* are photographs illustrating the use of the clinical dispenser and applicator collecting and dispensing one to two drops of bonding agent by squeezing the proximal shaft portion, according to an embodiment of the present invention.

Figure 4:
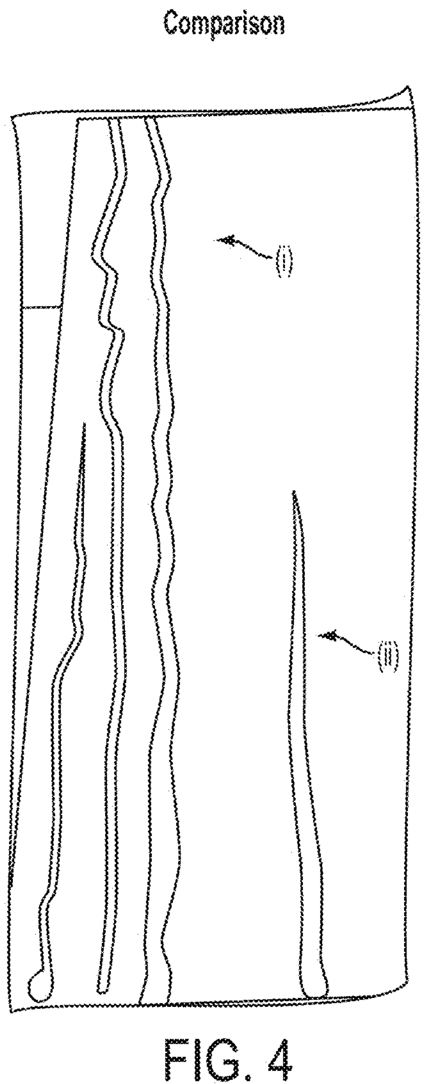
FIG. 4 is a photograph showing an experimental comparison between a (i) clinical dispenser and applicator of an embodiment of the present invention and (ii) conventional Microbrush® dispenser/applicator.

FIG. 4 is a photograph showing a comparison between a (i) clinical dispenser and applicator of an embodiment of the present invention and (ii) a conventional Microbrush® dispenser/applicator. As shown in (i), the clinical dispenser and applicator of an embodiment of the present invention shows that there is almost twice as much of bonding agent available for use after one squeeze of the clinical dispenser and applicator, as compared to (ii) which illustrates the amount of bonding agent available for use after single dip of the Microbrush® dispenser/applicator tip in a dispensed drop in a well.

Figures 5A, 5B:
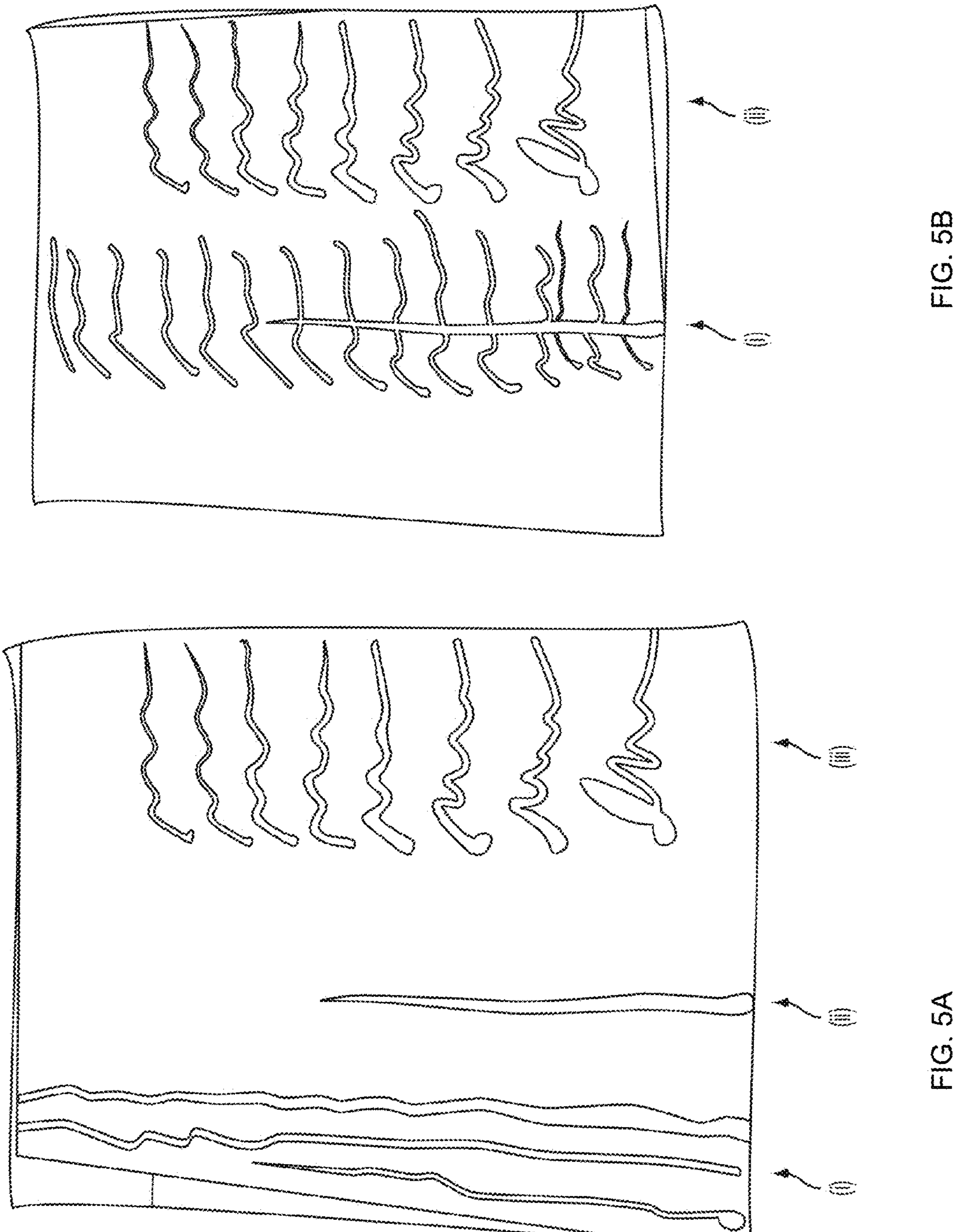
FIG. 5A and FIG. 5B are photographs showing an experimental demonstration of and a comparison of the amount of liquid available for use with conventional Microbrush® dispenser/applicator vs. clinical dispenser and applicator of an embodiment of the present invention.

FIG. 5*a-b* are photographs showing an experimental demonstration of a comparison of the amount of liquid available for use with conventional Microbrush® dispenser/applicator vs. clinical dispenser and applicator of an embodiment of the present invention. In brief, these photographs show available bonding agent and number of repeated dips needed during the use of a conventional Microbrush® dispenser/applicator vs. one squeeze of a clinical dispenser and applicator of an embodiment of the present invention containing the same amount of bonding agent as in the separate dipping reservoir used for the conventional Microbrush® dispenser/applicator. FIG. 5*a*(*i*)-(*ii*) show a similar demonstration as shown in FIG. 4(*i*)-(*ii*). FIG. 5*a*(*iii*) shows the number of dips (8 total) necessary to use up one drop of bonding agent with the conventional Microbrush® dispenser/applicator.

Turning to FIG. 5*b*, (*i*) shows that one full squeeze of a clinical dispenser and applicator of an embodiment of the present invention containing one drop of bonding agent is able to provide 12 applications without dipping. In comparison, 5*b*(*ii*) shows that 8 dips of the conventional Microbrush® dispenser/applicator is necessary to use up one drop of bonding agent. The difference in application performance is due to the issues referenced above including evaporation or splattering of the bonding agent, for example, when using the conventional Microbrush® dispenser/applicator.

Figure 6:
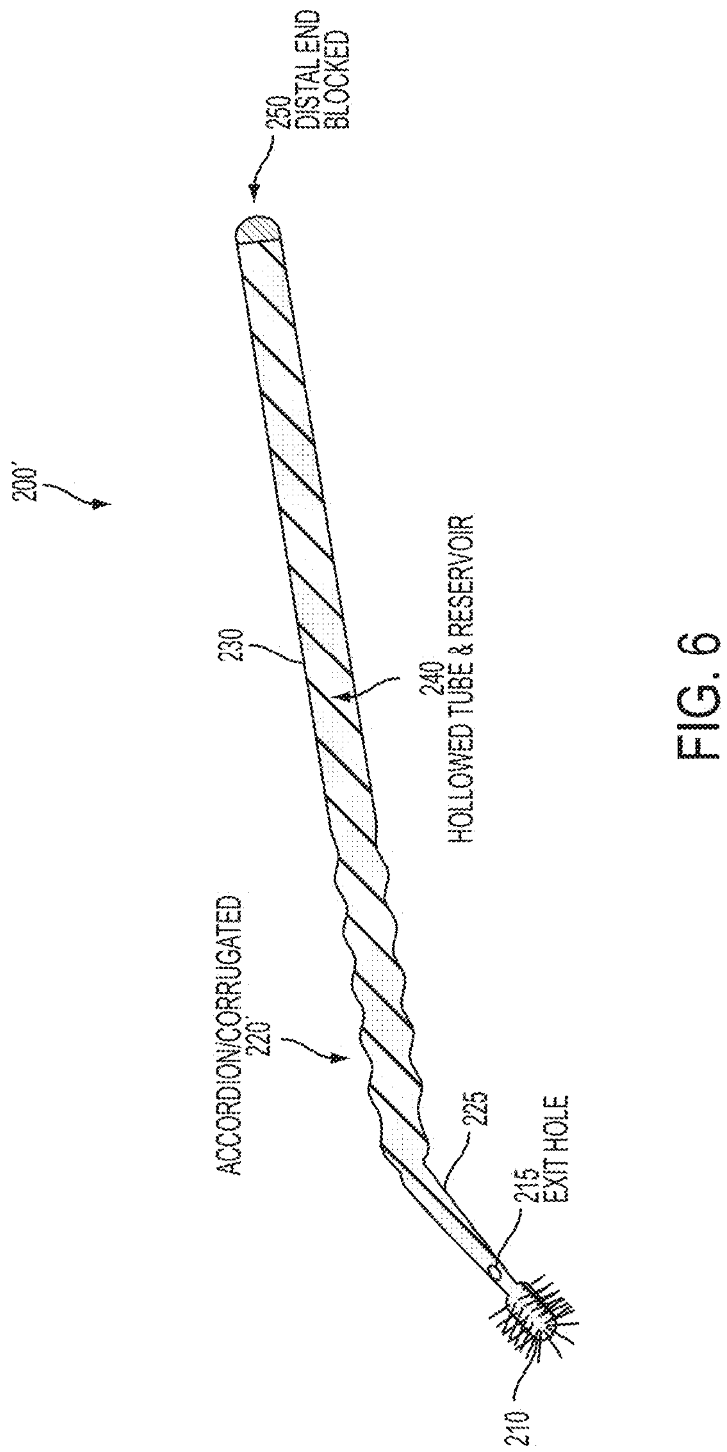
FIG. 6 shows a side perspective view of a clinical dispenser and applicator, according to an alternative embodiment of the present invention.

FIG. 6 shows a side perspective view of a clinical dispenser and applicator, according to an alternative embodiment of the present invention. The clinical dispenser and applicator 200' can include a distal shaft 230 extending along a longitudinal axis, at least a portion of which is hollowed out (i.e., a reservoir portion) 240, a neck portion 220' which is bent at an angle from the shaft (preferable about 45 degrees) and has an accordion/corrugated structure, a hollowed out proximal tube portion 225 and a fiber applicator tip 210. The hollowed out proximal tube portion includes an exit hole 215, and the distal shaft is closed off at the most distal end 250.

Figure 7:
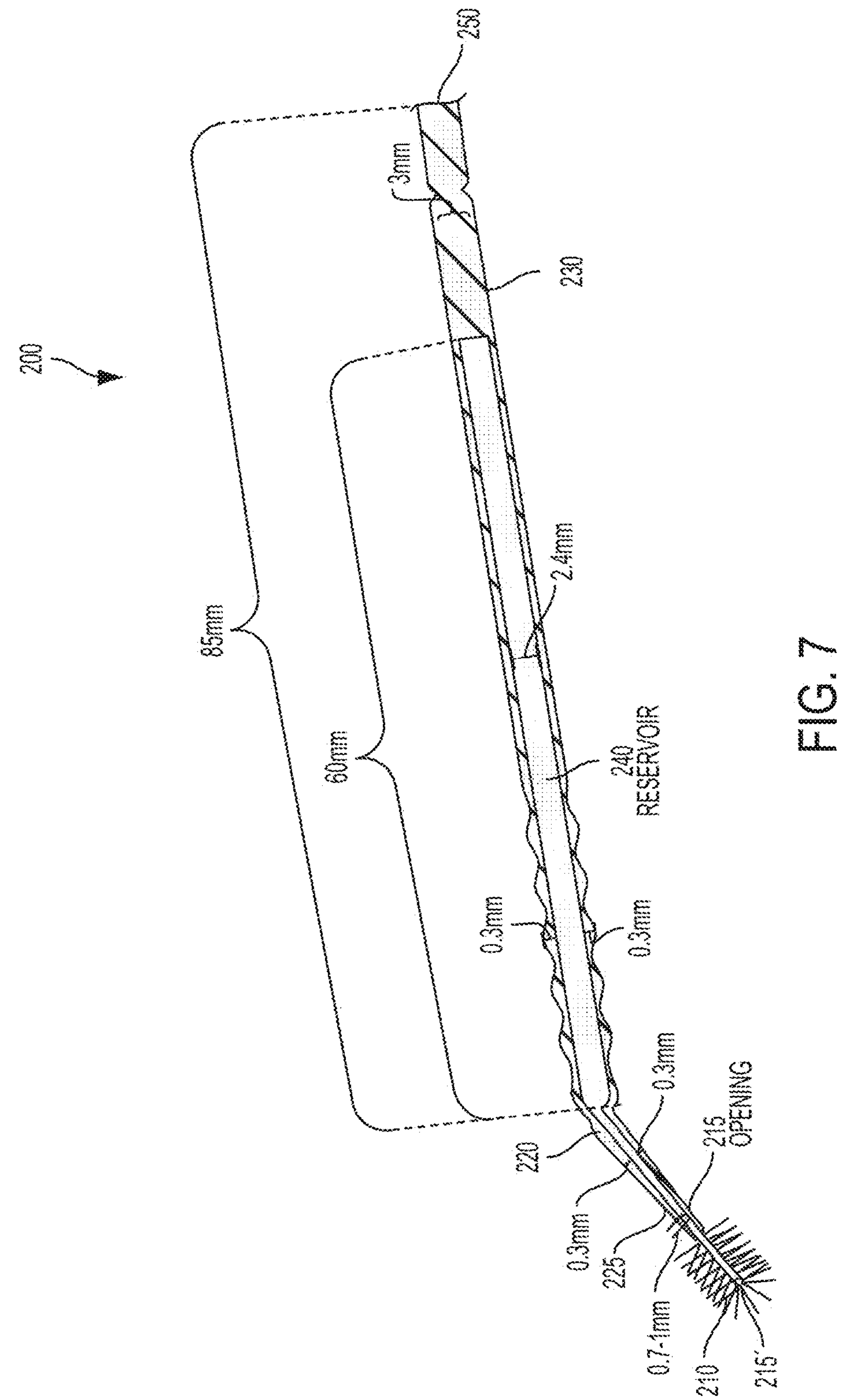
FIG. 7 is a side perspective view of a clinical dispenser and applicator, according to an embodiment of the present invention.

FIG. 7 shows a side perspective view of a clinical dispenser and applicator, according to an embodiment of the present invention. The clinical dispenser and applicator FIG. 7 is similar to the clinical dispenser and applicator in FIG. 2, and shows a clinical dispenser and applicator 200 that can include a distal shaft 230 extending along a longitudinal axis, at least a portion of which is hollowed out (i.e., a reservoir portion) 240, a neck portion 220 which is bent at an angle from the shaft (preferable about 45 degrees), a hollowed out proximal tube portion 225 and a fiber applicator tip 210. The hollowed out proximal tube portion can include an exit hole 215 at the distal end of the fiber applicator tip 210 or at the proximal end thereof (215'), and the distal shaft is closed off at the most distal end 250.

The following description with reference to FIGS. 8 to 12B relates to alternative embodiments of the clinical dispenser and applicator described above. The alternative embodiments include alternate and sometimes additional components, however, many of the alternative embodiments function in a similar manner as the previously described embodiments. Thus, the discussion set forth above with respect to functionality and to other specifics of many of the features/elements of the previously described embodiments applies to the alternative embodiments discussed below (unless otherwise specifically noted).

Figure 8A:
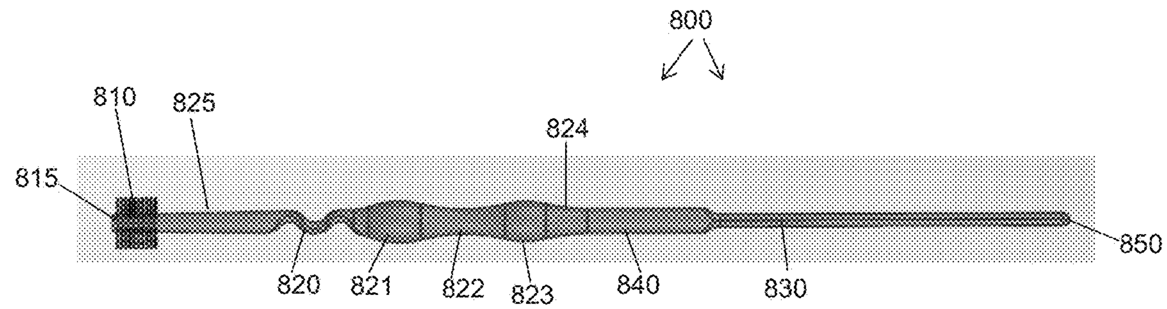
FIG. 8A is a side perspective view of a clinical dispenser and applicator is shown according to an alternative embodiment of the present invention.

Turning to FIG. 8A, a side perspective view of a clinical dispenser and applicator 800 is shown according to an alternative embodiment of the present invention. The clinical dispenser and applicator 800 can include a distal shaft 830 extending along a longitudinal axis, at least a portion of which is hollowed out (i.e., a reservoir portion) 840, a defection feature 820, a hollowed out proximal tube portion 825 and a proximal tip 810.

The deflector 820 is preferably "S"-shaped (curved or arcuate shaped), is bendable, and allows the proximal tube portion 825 to move in all directions, i.e., the proximal tube portion 825 can be bent at an angle in any direction with respect to the distal shaft 830. Practically, deflector 820 allows the most bendability of the proximal tube portion 825 in one plane—"up" and "down" within the plane of the page as one looks at FIG. 8A, and up to at least a preferable angle of 45 degrees. This bendability feature allows the proximal tip 810 to be maneuvered and to reach all areas of a patient's mouth.

The proximal tip 810 can contain a plurality of bristles/fibers that circumferentially surround the proximal tip 810 and form a brush. The bristles can be organized on the tip

810, e.g., in a plurality of distinct lines extending in lines parallel to the longitudinal axis, or can be in a random distribution on the tip 810. The hollowed out proximal tube portion can include an exit hole 815 at the proximal end thereof (which can also be positioned distally a distance from the proximal end within the rea of the bristles of the brush or beyond), and the distal shaft is closed off at the most distal end 850.

The hollowed out portion 840 can include portions of differing diameters. For example, sections 821 and 823 each have a larger diameter and surround section 822 of a relatively smaller diameter (alternatively, this configuration of diameter sizes can be reversed). These differing diameter sections of the hollowed-out portion 840 allow for better finger/hand placement and use (maneuverability to mix solutions in a mixing well, to draw mixed solutions into the hollowed out portion 840, and to aspirate solutions onto a patient's teeth) of the clinical dispenser and applicator 800.

Figure 8B:
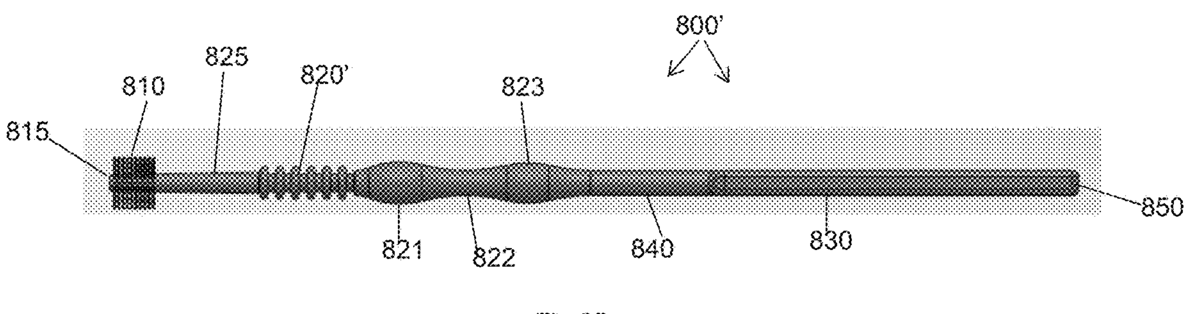
FIG. 8B is a side perspective view of a clinical dispenser and applicator is shown according to an alternative embodiment of the present invention.

Turning to FIG. 8B, a side perspective view of a clinical dispenser and applicator 800' is shown according to an alternative embodiment of the present invention. The embodiment of the clinical dispenser and applicator 800' shown in FIG. 8B is very similar to the embodiment of the clinical dispenser and applicator 800 shown in FIG. 8A, except for a modified deflector 820'. Deflector 820' is made of raised helical/circumferential ridge/rib portions instead of an "S"-shape shown in FIG. 8A, which can include micro channels in between each ridge. The structure of deflector 820' allows the deflector 820', and hence the proximal tube portion 825, to be maneuvered in all directions with equal bendability and up to at least a preferable angle of 45 degrees.

Figure 8C:
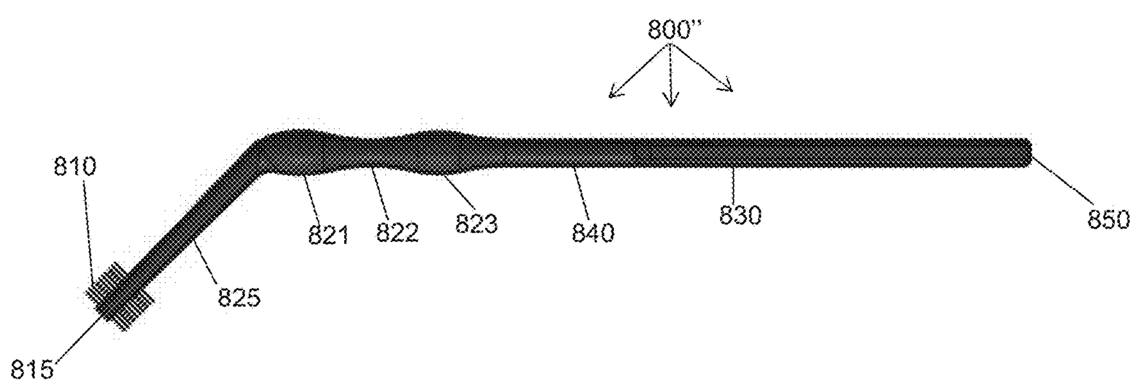
FIG. 8C is a side perspective view of a clinical dispenser and applicator is shown according to an alternative embodiment of the present invention.

Turning to FIG. 8C, a side perspective view of a clinical dispenser and applicator 800" is shown according to an alternative embodiment of the present invention. The embodiment of the clinical dispenser and applicator 800" shown in FIG. 8C is similar to the embodiments of the clinical dispenser and applicator 800 and 800' shown in FIGS. 8A and 8B, respectively, except that it does not include a deflector and the proximal tube portion 825 is bent at an angle from the hollowed out portion 840 (preferably at about 45 degrees—similarly to embodiments shown in FIGS. 2, 6 and 7).

Figure 9:
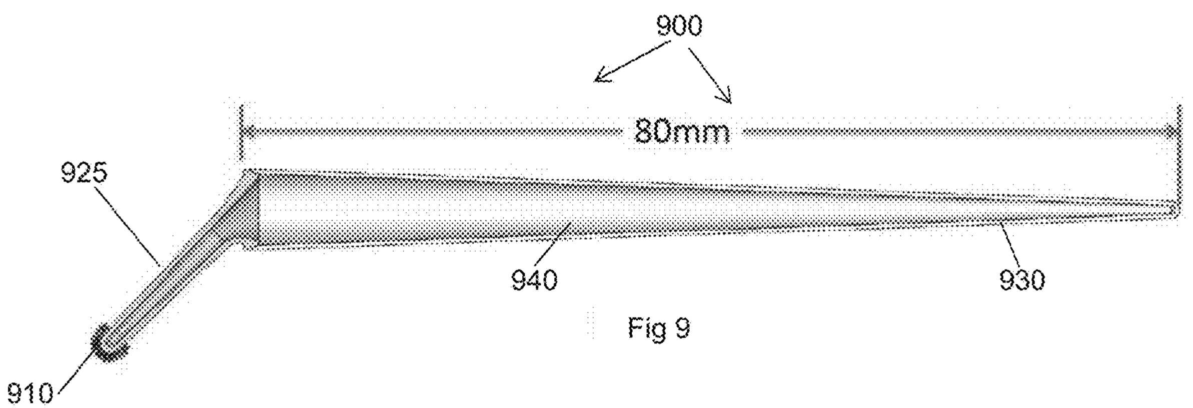
FIG. 9 is a side perspective view of a clinical dispenser and applicator is shown according to an alternative embodiment of the present invention.

Turning to FIG. 9, a side perspective view of a clinical dispenser and applicator 900 is shown according to an alternative embodiment of the present invention. The clinical dispenser and applicator 900 can include a distal shaft 930 extending along a longitudinal axis, at least a portion of which is hollowed out (i.e., a reservoir portion) 940, a hollowed out proximal tube portion 925 and a proximal tip 910. The distal shaft 930 is tapered from the proximal end to the distal end. This clinical dispenser and applicator 900 is similar to the clinical dispenser and applicator shown in FIGS. 2, 6 and 7, with the proximal tube portion 925 being bent at an angle (preferably at least 45 degrees) from the distal shaft 830.

Figure 10A:
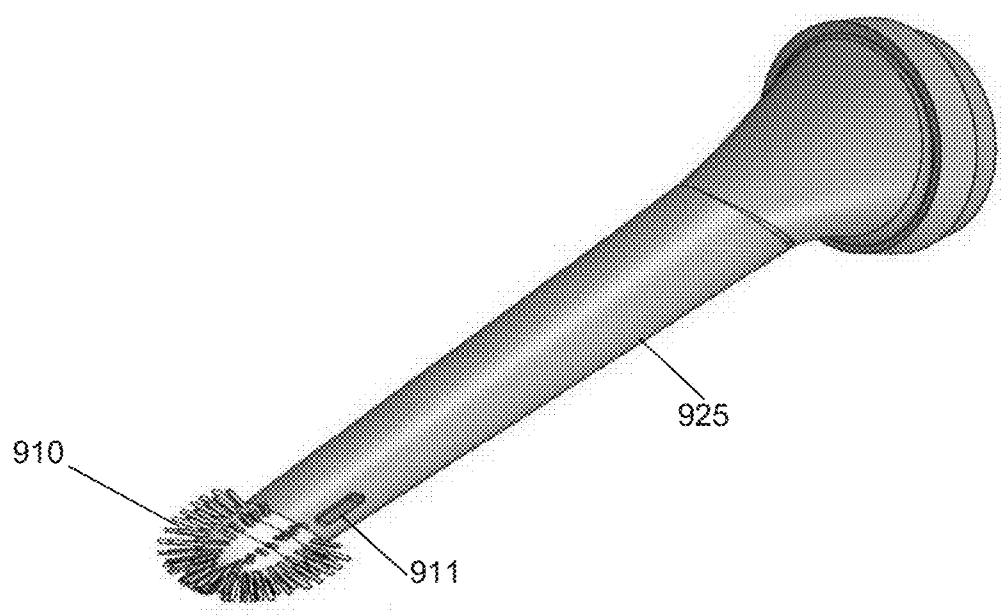
FIG. 10A is a side perspective view of the proximal tube portion and proximal tip of the clinical dispenser and applicator shown in FIG. 9 according to an alternative embodiment of the present invention.
Figure 10B:
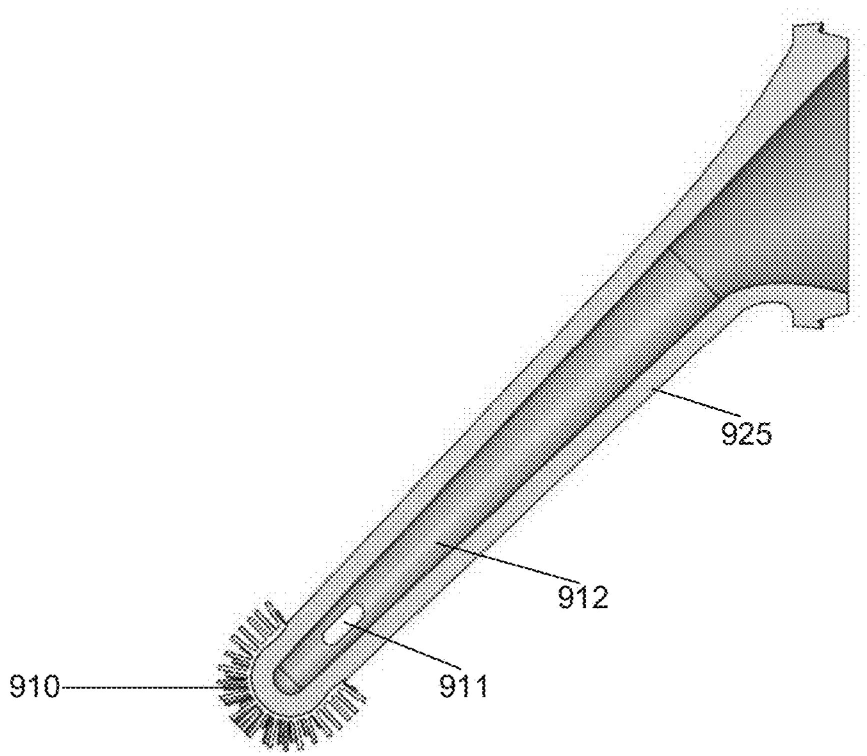
FIG. 10B is a side perspective cross-sectional view of the proximal tube portion and proximal tip of the clinical dispenser and applicator shown in FIG. 9 according to an alternative embodiment of the present invention.

Turning to FIGS. 10-12, side perspective views of various alternative proximal tube portion and proximal tip designs are shown. FIGS. 10A and 10B show the proximal tube portion and proximal tip of FIG. 9 in further detail, which includes a proximal tube portion 925 and proximal tip 910 (which is flocked with bristles). At least one slot 911 (which can be, e.g., two or more) is also shown, which is used to suction and dispense dental material/solutions into and from the interior of the proximal tube portion 925 (and to and from the hollowed out portion 940 (not shown) through the interior 912 of the proximal tip 910). The at least one slot 911 is positioned a distance from the proximal end of the proximal tip 910 above the flocked bristles for fluid ingress/egress. The at least one slot 911 can also be positioned at the proximal end of the proximal tip 910.

Figure 11A:
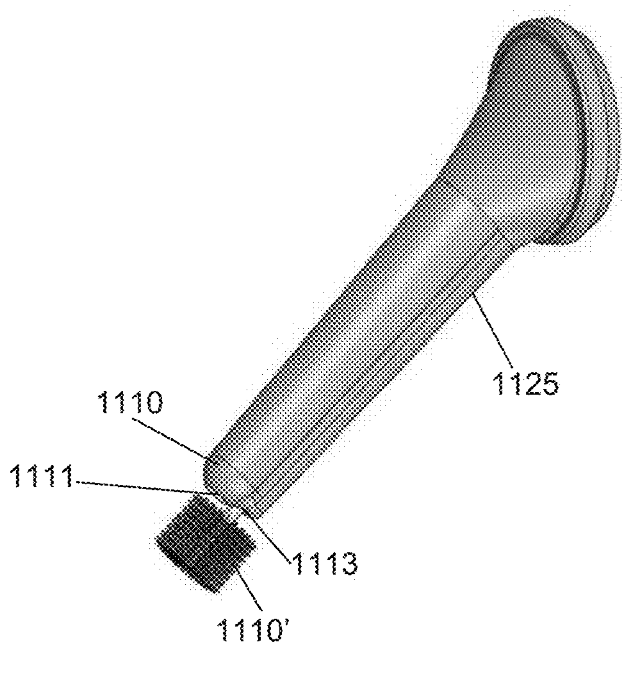
FIG. 11A is a side perspective view of the proximal tube portion and proximal tip of a clinical dispenser and applicator according to an alternative embodiment of the present invention.
Figure 11B:
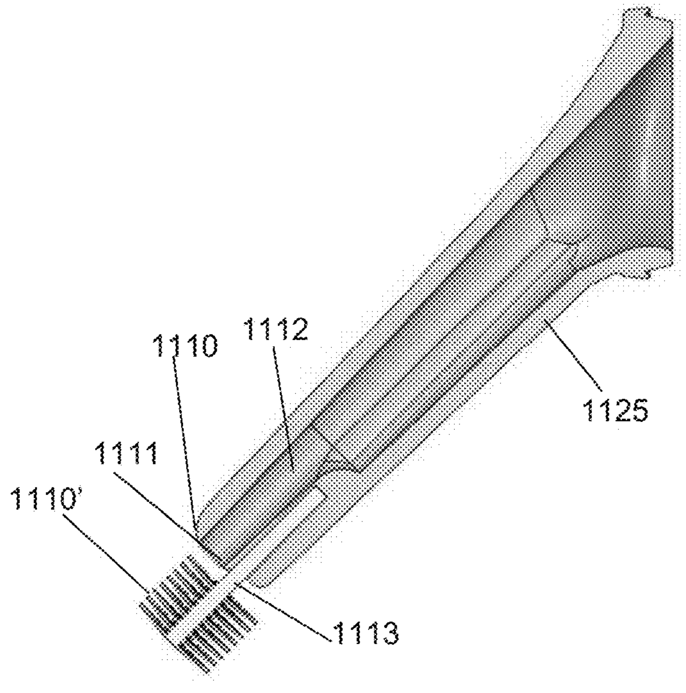
FIG. 11B is a side perspective cross-sectional view of the proximal tube portion and proximal tip of a clinical dispenser and applicator shown in FIG. 11A according to an alternative embodiment of the present invention.

FIGS. 11A and 11B show a proximal tube portion 1125 and proximal tip 1110. A wire filament 1113 (which can also be made from a synthetic material such as a thermoplastic polymer) extends from the proximal end of the proximal tip 1110. The wire filament 1113 can be flocked with bristles 1110', similar to the connection of bristles to the proximal tips of previously described embodiments. At least one hole 1111 is also shown at the end of the proximal tip 1110 above the bristles 1110', which is used to suction and dispense dental material/solutions into and from the interior of the proximal tube portion 1125 (and to and from the hollowed out portion 1140 (not shown) through the interior 1012 of the proximal tip 1110).

Figure 12A:
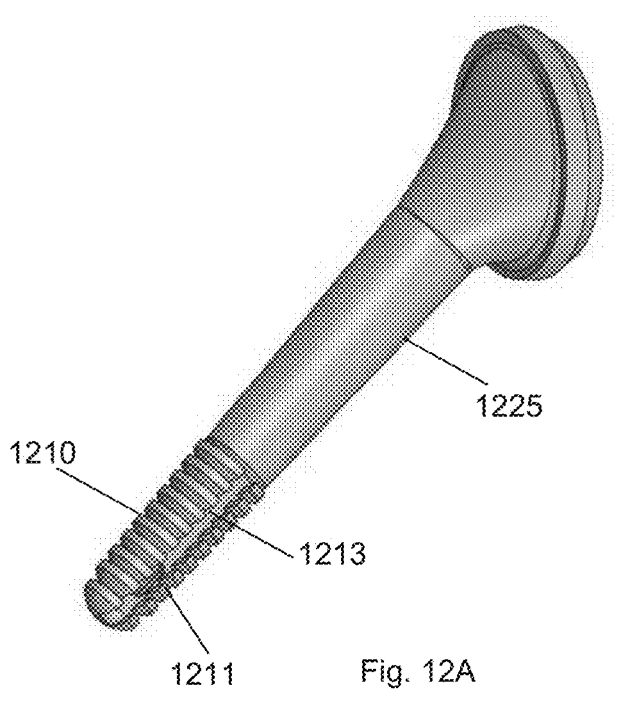
FIG. 12A is a side perspective view of the proximal tube portion and proximal tip of a clinical dispenser and applicator according to an alternative embodiment of the present invention.
Figure 12B:
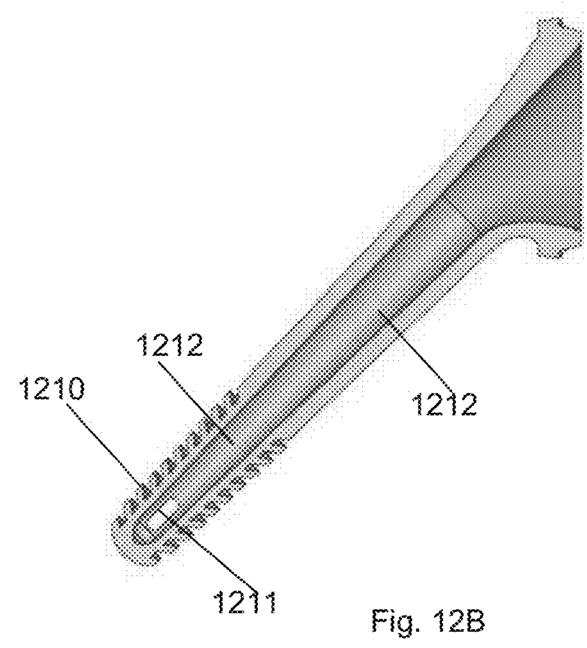
FIG. 12B is a side perspective cross-sectional view of the proximal tube portion and proximal tip of a clinical dispenser and applicator shown in FIG. 12A according to an alternative embodiment of the present invention.

FIGS. 12A and 12B show a proximal tube portion 1225 and proximal tip 1210. Instead of being flocked with bristles, the proximal tip 1210 is includes flexible raised helical/circumferential ridge/rib portions (at least partially extending around the circumference of the proximal tube portion), which can include micro channels in between each ridge. At least one slot 1211 (which can be, e.g., two or more) is also shown, which is used to suction and dispense dental material/solutions into and from the interior of the proximal tube portion 1225 (and to and from the hollowed out portion 1240 (not shown) through the interior 1212 of the proximal tip 1210). The at least one slot 1211 is positioned a distance from the proximal end of the proximal tip 1210 for fluid ingress/egress. The at least one slot 1211 can also be positioned at the proximal end of the proximal tip 1010. A channel 1213 is also shown extending along the exterior surface of the proximal tube portion in a direction orthogonal to the direction of the circumferential rib portions.

Each of the clinical dispenser and applicators described herein can be formed of a thermoplastic polymer material (e.g., low density polyethylene (LDPE), polypropylene (PP)), and from a blow molding process, a pressure molding process, an injection molding process, 3D printing process, or any other process as should be appreciated by a person of ordinary skill in the art. This thermoplastic polymer material allows the hollowed-out portion of the distal shaft to be configured to be squeezable to create a vacuum to suction a material into a material reservoir through the exit hole of the device (from a well containing the material), and to dispense the material from the material reservoir through the exit hole onto a predetermined area of interest.

The manufacturing process can include injection molding the clinical dispenser and applicator in multiple parts (e.g., proximal tube portion and distal shaft), and then connect the multiple components together (spin welding or other connection process as should be appreciated by those of skill in the art). A preferable design includes a hollowed out portion 840 that distorts enough on squeezing to pick/suction up and draw in, and dispense, at least 2 drops of liquid of about 0.01 ml to 1.5 ml each (e.g., a mixture of one or two dental solutions/bonding agent, or a single dental material/bonding agent). The bristles can be added/connected by an electrostatic flocking process or any other process, as should be appreciated by a person of ordinary skill in the art. Generally, the proximal tips can be smaller in diameter and of a length as needed to reach to reach into the back of a patient's mouth (which can vary). Additionally, instead of a bristled or flocked proximal tip, the proximal tip can comprise foam attached thereto.

Figure 13:
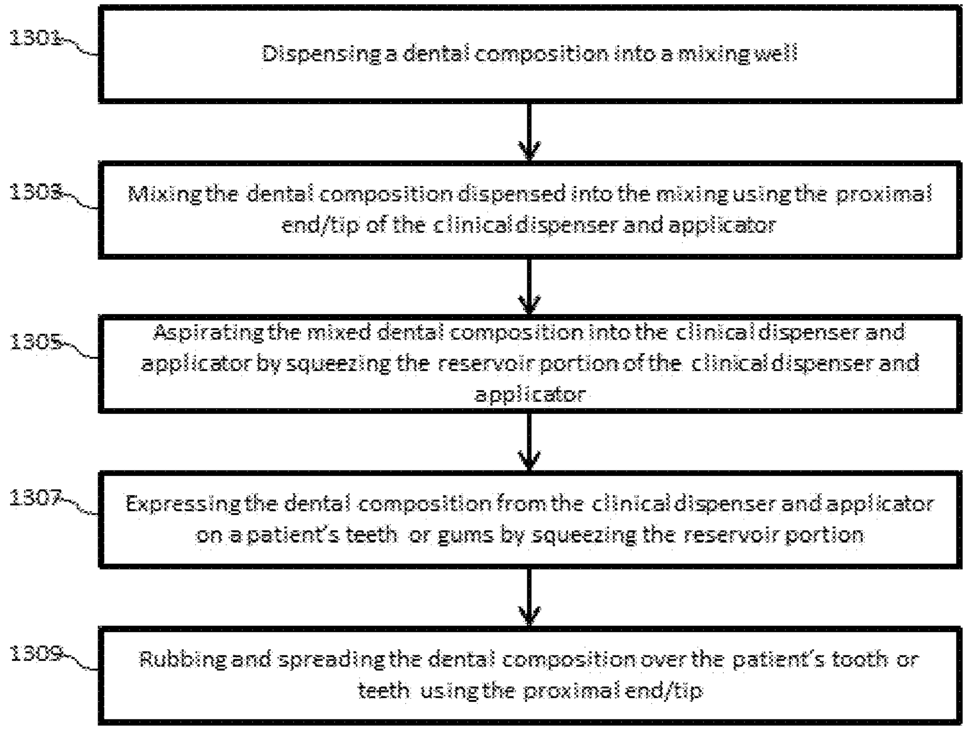
FIG. 13 is a flow chart showing a method according to an embodiment of the present invention.

Each of the clinical dispenser and applicators described herein can be used in methods (see FIG. 13) to dispense a dental composition (which can include components such as bonding agent(s), medicine, and/or any other dental related compositions, or any combination thereof) into a mixing bowl or well and mix the dental composition in the mixing well prior to applying the mixed dental composition to a patient's teeth. The method can include, but is not required to include, each of the following steps.

At step 1301, a dental composition (which can include one or more components such as the components referenced above) is dispensed into a mixing well. As should be understood and appreciated by those of skill in the art, a mixing well is a hemispherically-shaped cavity (although the cavity can be formed of other shapes) that is closed on a bottom and open at a top (such as the wells 1-4 shown in FIG. 3*a*). A commercial example of such a mixing well includes disposable mixing wells made by Patterson Dental (e.g., model nos. 088-7315 and 088-7323).

At step 1303, any of the embodiments of the clinical dispenser and applicators described herein can be used to mix the dental composition dispensed into the mixing well (by stirring and/or other motions including aspiration) using the proximal end/tip of the clinical dispenser and applicator.

At step 1305, the preferably mixed dental composition is aspirated into the clinical dispenser and applicator by squeezing the reservoir portion of the clinical dispenser and applicator (which effectively creates a vacuum to accomplish the aspiration).

At step 1307, the filled (partially or fully) clinical dispenser and applicator can be moved to a patient's tooth or teeth (and gums as may be necessary) on which the dental composition needs to be applied, then the clinical dispenser and applicator can be used to express the dental composition contained within the clinical dispenser and applicator on the patient's tooth or teeth on which the dental composition needs to be applied by squeezing the squeezing the reservoir portion to evacuate the dental composition (which may or may not be fully evacuated) from the clinical dispenser and applicator.

At step 1309, the proximal tip portion of the clinical dispenser and applicator is used to rub and spread the dental composition over the patient's tooth or teeth (and gums as may be necessary). These steps are repeated as may be necessary to provide a sufficient amount of dental composition to a patient's teeth where needed.

As described, in an exemplary embodiment, the clinical dispenser and applicator is not preloaded with any dental composition (although it can be). The dental composition is expressed into a mixing well from a bulk or other container, is mixed in the mixing well by the clinical dispenser and applicator, aspirated in the clinical dispenser and applicator, and expressed onto the patient's teeth/gums by the clinical dispenser and applicator.

While several embodiments of the invention have been discussed, it will be appreciated by those skilled in the art that various modifications and variations of the present invention are possible. Such modifications do not depart from the spirit and scope of the present invention.

What is claimed is:

1. A clinical dispenser and applicator comprising:

an elongated distal shaft having a first end and a second end and extending along a longitudinal axis and having a continuous taper decreasing in cross section from a most proximal end of the first end to a most distal end of the second end, a portion of which is hollowed-out defining a material reservoir beginning at a proximal end thereof, wherein the hollowed-out portion comprises a first section including a diameter that is smaller than a diameter of an adjacent section that is proximal to the first section or a diameter of an adjacent section that is distal to the first section;

a proximal tube portion comprising an exit hole, the proximal tube portion connected to the elongated distal shaft;

wherein said hollowed-out portion of said elongated distal shaft is configured to be squeezable to create a vacuum to suction a material into said material reservoir through said exit hole from a well containing the material and to dispense the material from said material reservoir through said exit hole onto a predetermined area of interest; and wherein the proximal tube portion is bent at an angle relative to the longitudinal axis.

2. The clinical dispenser and applicator of claim 1, wherein said proximal tube portion further comprises a longitudinal axis and a proximal tip having the exit hole, which substantially encircles the longitudinal axis of the proximal tube portion.

3. The clinical dispenser and applicator of claim 2, further comprising a plurality of fibers or bristles extending circumferentially from the proximal tip.

4. The clinical dispenser and applicator of claim 3, wherein the fibers or bristles are arranged in distinct lines substantially perpendicular to the longitudinal axis of the proximal tube portion.

5. The clinical dispenser and applicator of claim 1, wherein said material comprises a dental composition.

6. The clinical dispenser and applicator of claim 5, wherein said dental composition comprises a composition selected from the group consisting of bonding materials, primers, silane and hemostatic agents.

7. The clinical dispenser and applicator of claim 1, wherein said predetermined area of interest comprises a tooth structure.

8. The clinical dispenser and applicator of claim 1, the angle is up to and including 45 degrees.

* * * * *